Figure 1:
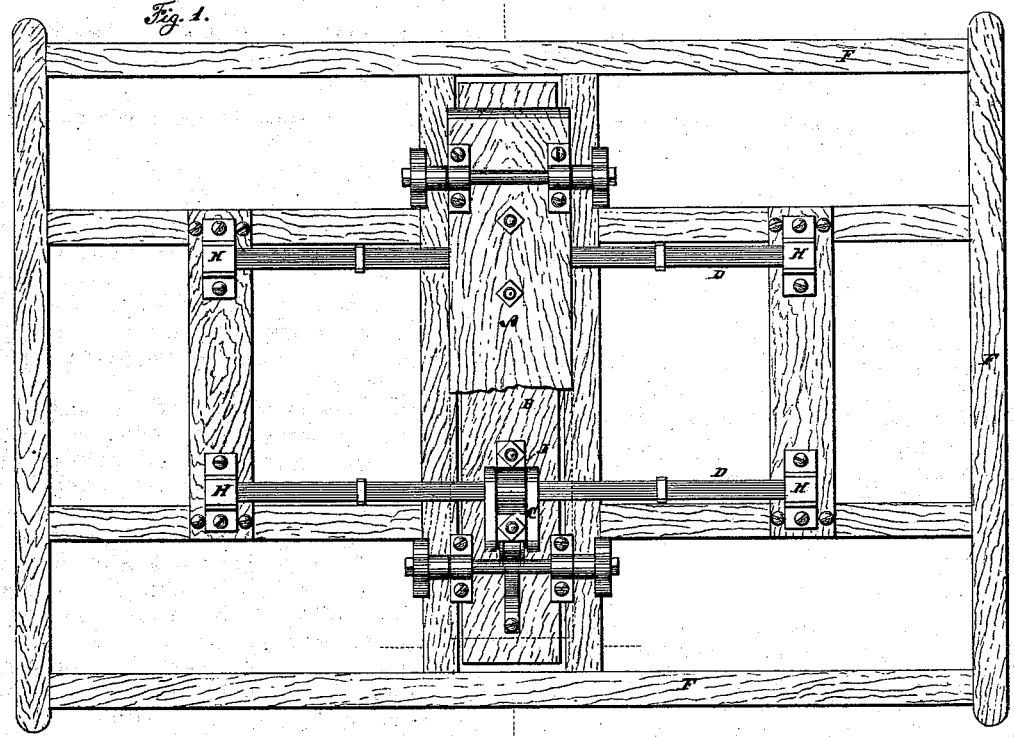

C. W. SALADEE.
Torsion-Springs for Railway-Cars.

No. 154,917. Patented Sept. 8, 1874.

WITNESSES:  INVENTOR:

UNITED STATES PATENT OFFICE.

CYRUS W. SALADEE, OF BRIDGEWATER, PENNSYLVANIA.

IMPROVEMENT IN TORSION-SPRINGS FOR RAILWAY-CARS.

Specification forming part of Letters Patent No. 154,917, dated September 8, 1874; application filed September 2, 1874.

*To all whom it may concern:*

Be it known that I, CYRUS W. SALADEE, of Bridgewater, county of Beaver, in the State of Pennsylvania, have invented a certain Improvement in the Application of Springs to Railway-Car Trucks, of which the following is a specification embodying my said invention.

The first part of my invention consists in a new and improved method of applying torsional springs to the trucks of railway-cars in such manner that they are secured, by suitable bearings and connections, in a position lengthwise the truck and on a line parallel with the rails of the road over which the trucks move. The object sought to be attained by this mode of applying the springs lengthwise in place of crosswise the truck-frame is to secure a greater length of spring than can now be done by applying a torsional spring at right angles across the truck, as is the universal custom. By placing the springs lengthwise the truck, as seen in the drawing, Fig. 1, any desired length of spring is had and a degree of elasticity and softness of motion in the spring's action is secured, which is not attainable in the present method of applying torsional springs to railway-trucks.

The second part of my invention consists in providing the central portion of torsional springs with a crank operating in a loose bearing secured to the swinging bolster of the truck, the top end of the crank being provided with a friction-roller, and the latter operating in a circular friction-plate secured to the top bolster of the truck, and has for its object a free side or lateral motion of the top bolster, on which rests the body of the car.

Figure 2:
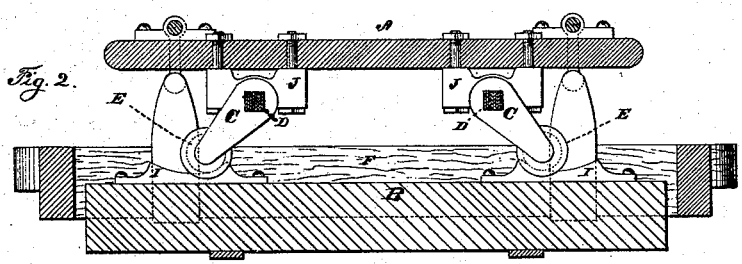

In the drawings, Figure 1 is a plan view of the frame and bolster now in general use in passenger railway-trucks. In this figure we have the frame reversed, giving a bottom view of the truck, with the springs and their connections applied in position thereon. Fig. 2 is a cross-section of the same through the center of the truck and bolsters, and Fig. 3 is a reversed side elevation of same.

A is the swinging bolster of the truck. B is the upper bolster of the truck; C, the cranks secured to the torsional springs at or about center between their ends; D, the torsional springs; E, the friction-rollers in top of cranks; F, the frame-pieces of the truck; H, the outer bearings, rigidly holding the opposite ends of the springs D; I, the circular friction-plate or bearing, resting upon the friction-rollers E; J, the bearings on lower bolster A, in which are supported the cranks and the central portion of the springs.

Figure 3:
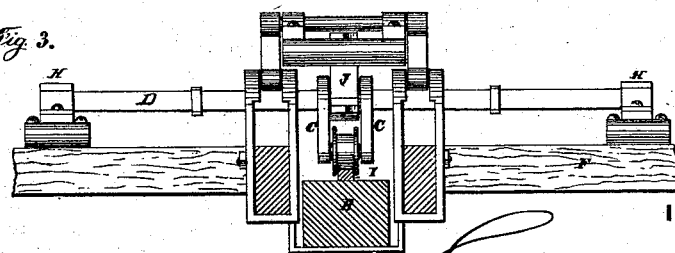

By reference to Figs. 1 and 3, it will be seen that a double crank, C, is employed, the base ends of which are united, and through which is passed the spring D, and the whole loosely supported within the bearings I secured to the lower swinging bolster A, while between the top ends of the double crank is pivoted, by a passing bolt, the friction-roller E. On the upper or top bolster B are secured the friction-plates I, the bearing-surface of which, in contact with the friction-roller, is in the form of the segment of a circle, and loosely rests on the friction-rollers, so as to admit of the top bolster (on which rests the body of the car) freely moving from one side to the other while the truck is in motion, and thus relieve the body of the car from that sudden jar which it would otherwise receive in running sharp curves or in passing over irregularities on the road.

The springs here shown are the "compound torsional springs" for which I have already obtained a grant of Letters Patent of the United States; but I do not confine my claim to any particular form of torsional spring, as almost any form of such spring may be thus employed. The opposite ends of the spring D are rigidly and firmly held in the bearings H, while their central portion, between the ends, is in like manner firmly held within the base of the crank C, and the latter loosely supported in its bearing J, so as to admit of the torsional action of the spring from the center toward the opposite ends when a pressure is brought to bear upon the friction-rollers E. So far as I know, in every modification of torsional spring as applied to railway-trucks and other wheeled vehicles, the torsional action is had from the opposite ends toward the center by reason of the cranks or their equivalent being secured to the ends of the spring in place of the central portion, as herein described and as shown in the drawings. In this way I make one crank answer the purpose of two, as compared to the well-known method of operating torsional springs generally.

I claim as my invention—

1. The torsional springs applied to operate lengthwise of the frame of the car-truck, and combined therewith, substantially as shown and described.

2. The crank C, secured to the torsional springs at a suitable point between their opposite ends, and the top end of said crank being provided with a friction-roller to operate upon the circular-faced friction-plates I, all combined substantially as and for the purpose set forth.

3. The top bolster B, provided with circular-faced friction-plates I, to rest and operate upon friction-rollers in such manner as to allow a free lateral movement to said bolster, all combined substantially as and for the purpose set forth.

CYRUS W. SALADEE.

Witnesses:
WM. H. MINNIX,
GEO. T. MASON.